United States Patent Office 3,780,014
Patented Dec. 18, 1973

3,780,014
OCTAPEPTIDE INTERMEDIATE TO GONADO-
TROPIN RELEASING HORMONE
George Rogelio Flouret, Waukegan, Ill., assignor to
Abbott Laboratories, Chicago, Ill.
No Drawing. Filed Sept. 16, 1971, Ser. No. 181,197
Int. Cl. C07c 103/52; C07g 7/00; C08h 1/00
U.S. Cl. 260—112.5                                8 Claims

ABSTRACT OF THE DISCLOSURE

The synthesis of the octapeptide Trp-Ser-Tyr-Gly-Leu-Arg-Pro-Gly-amide carrying easily removable protective groups on the Ser, Tyr, Arg and Trp moieties is described; the correspondingly protected heptapeptide is used as the starting material. The octapeptide, upon removal of any protective group on the amino-N of the tryptophane moiety is an important intermediate for the preparation of the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, small doses of this Gn-RH administered by intravenous injections to female sheep in the anestrus cycle produces ovulation. The formula of the Gn-RH has been identified with the amino acid sequence pyroGlu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisingly good yields. The new method involves a minimum of group-protecting and removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

The present invention is particularly concerned with the octapeptide which is one of the precursors for making Gn-RH and carries protective groups on the active sites of the serine, tyrosine and arginine moieties that can be removed by simple methods, if desired, to make the unprotected octapeptide or, if desired, after further peptide chain extension. It is another object of the present invention to provide a process for the preparation of a protected octapeptide that may be used directly for making the corresponding nonapeptide which is a direct precursor to Gn-RH. It is a further object of this invention to provide a poly-protected octapeptide that can be used without adding further protective groups as an intermediate to make the correspondingly protected Gn-RH.

These and other objects are accomplished by providing

Y - Trp - (O-R)Ser-(O-R')Tyr-Gly-Leu-(N$^\omega$-R'')Arg-Pro-Gly-NH$_2$   (I)

wherein R, R' and R'' are protective groups that are removable by hydrogenation or treatment with hydrofluoric acid and R is hydrogen or a protective group that can be removed from the peptide without affecting R,R' and R''; ordinarily, R is represented by tetrahydropyranyl, tert.-butyl, acetyl, benzyloxycarbonyl or benzyl; R' is tetrahydropyranyl, tert.-butyl, acetyl, benzyloxycarbonyl, benzyl, triphenylmethyl or tosyl and R'' is nitro, tosyl, benzyloxycarbonyl, p-nitrobenzyloxycarbonyl or tetrachloroisopropyloxyphthaloyl which is used to substitute one of the hydrogen atoms in the amino group of the guanidine moiety in Arg; Y is hydrogen, tert.-butoxycarbonyl, o-nitrophenylsulfenyl, 2 - (diphenyl)isopropyloxycarbonyl, benzyloxycarbonyl or phthalyl.

The protected octapeptide of Formula I is prepared by reacting the protected heptapeptide (O-R)Ser-(O-R')Tyr-Gly-Leu-(N$^\omega$-R'')Arg-Pro-Gly-NH$_2$ with Y-Trp in an inert solvent; Y-Trp is

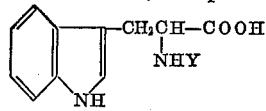

wherein Y is tert.-butyloxycarbonyl, benzoxycarbonyl, p-nitro-or p-methoxybenzyloxycarbonyl, 2 - (p-diphenyl)isopropyloxycarbonyl, o-nitrophenylsulfenyl, phthalyl or trifluoroacetyl. The protective group Y can be removed by conventional methods to produce the octapeptide carrying protective groups R, R' and R''. This tri-protected octapeptide (Formula I; Y is hydrogen) can be converted to the similarly protected (R,R' and R'' are the same as above) decapeptide by reacting it first with N$^{\mathrm{Im}}$-protected (or unprotected) histidine carrying a N$^\alpha$-protective group and after removing the latter, with pyroglutamic acid pentachlorophenyl ester. The free decapeptide (or Gn-RH) can be obtained by treating the protected decapeptide with hydrogen fluoride. During this reaction, the protective groups R, R' and R'' all are removed and replaced by hydrogen. Alternately, some protective groups can be removed by hydrogenation using a palladium catalyst.

In a more specific embodiment, the above-named protected heptapeptide wherein R and R' are benzyl and R'' is NO$_2$ is dissolved in dimethylformamide at a concentration of between 0.1 and 1.0 molarity and a 0-50% excess over molarity of N-tert.-butyloxycarbonyltryptophane p-nitrophenyl ester or a similarly N$^\alpha$ protected ester of tryptophane at a temperature between 0 and 30° C. After several hours, the reaction solution is evaporated and the residue is dissolved in 15% methanol/chloroform and the solution is placed on a silica gel column. The column is eluted with chloroform containing increasing amounts of methanol until the desired octapeptide appears in the eluate. The desired fractions of eluate are then combined and crystallized.

In order to prepare Gn-RH from the above material, the protective group Y is removed from the Trp moiety by any of the suitable methods known in the peptide art and the resulting tri-protected octapeptide is condensed with N$^\alpha$-tert.-butyloxycarbonylhistidine or a similarly N$^\alpha$-protected histidine, the N$^\alpha$-protecting group is removed and the formed nonapeptide reacted with pyroglutamic acid pentachlorophenyl ester. The resulting tri-protected decapeptide is then dissolved in an inert solvent and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn-RH prepared in this manner is highly active in biological tests showing lutenizing hormone-releasing activity in warm-blooded animals.

In order to make the heptapeptide used as the starting material for the present invention, the following reaction sequence is carried out: N-benzyloxycarbonyl-proline p-nitrophenyl ester is reacted with glycinamide, preferably with an excess of the latter over the equimolar amount, and the obtained N-benzyloxycarbonyl-prolylglycinamide is converted to the unprotected dipeptide by hydrogenation or acid treatment. The prolylglycinamide is then reacted with $N^\alpha$-benzyloxycarbonyl-$N^\omega$-nitro-arginine to form a twice-protected tripeptide from which the benzyloxycarbonyl group is removed by acid treatment to furnish $N^\omega$-nitroarginyl-prolylglycinamide, hereinafter refered to as -($N^\omega$-$NO_2$)Arg-Pro-Gly-$NH_2$. The latter is reacted with N-tert.-butyloxycarbonyl-leucine p-nitrophenyl ester to produce a twice-protected tetrapeptide from which the tert.-butyloxycarbonyl group is removed by treatment with an acid to yield Leu-($N^\omega$-$NO_2$)Arg-Pro-Gly-$NH_2$. This $NO_2$-protected tetrapeptide is reacted with N-tert.-butyloxycarbonylglycine p-nitrophenyl ester to a twice-protected pentapeptide from which the tert.-butyloxycarbonyl group is removed as in the case of the tetrapeptide to produce Gly-Leu-($N^\omega$-$NO_2$)Arg-Pro-Gly-$NH_2$. In turn, this pentapeptide is reacted with N-tert.-butyloxycarbonyl-O-benzyl-tyrosine p-nitrophenyl ester to produce a hexapeptide with three protective groups. The tert.-butyloxycarbonyl group is removed by treatment of this material with trifluoroacetic acid/methylene chloride 1:1 to give the twice-protected hexapeptide (O-Bzl)Tyr-Gly-Leu-($N^\omega$-$NO_2$)Arg-Pro-Gly-$NH_2$. Finally, this twice-protected hexapeptide is reacted with N-tert.-butyloxycarbonyl-O-benzyl-serine p-nitrophenyl ester to produce a heptapeptide carrying four protective groups. The tert.-butyloxycarbonyl group is removed as in the case of the hexapeptide to yield the three-times protected heptapeptide (O-Bzl)Ser-(O-Bzl)Tyr-Gly-Leu-($N^\omega$-$NO_2$)Arg-Pro-Gly-$NH_2$.

All of the above condensation reactions are carried out in the presence of an inert solvent such as dimethylacetamide or dimethylformamide or other organic liquids that do not react with either of the starting materials or the products of each step. Of course, it is to be understood that the above reaction sequence may be followed without using the specific protective groups named in each of the described stages. For instance, the benzyl groups used to protect the free hydroxy groups in serine or tyrosine may be replaced by tetrahydropyranyl, tert.-butyl, acetyl, trifluoroacetyl, benzyloxycarbonyl, and in the case of tyrosine also with triphenylmethyl or tosyl; the nitro group protecting the amino group in the guanidine moiety of arginine may be replaced by converting the amino group to an amide or half-amide with a sulfonic or a carboxylic acid, e.g., tosyl, benzyloxycarbonyl or tetrachloroisopropyloxyphthalyl. In all instances, the protective groups, of course, should be chosen in such a way that they can easily be removed by one or more simple treatments which are mild enough as not to affect the aminoacid chain bonds. This is the case with all above mentioned protective groups and also includes the p-nitro-, p-methyl- and p-methoxy substituted derivatives of the listed groups containing a benzyl moiety.

If desired, the protective groups may be removed stepwise; for instance, where R and R' are the usual benzyl or substituted benzyl ethers, these groups may be removed by hydrogenation and subseqeuntly, the protective group on the arginyl fragment can be removed by a suitable reaction step that does not affect the aminoacid links. Of course, such a reaction sequence may be reversed, if desired.

In order to show the preparation of the new octapeptide, reference is made to the following examples which are to be understood as illustrations only and are not to be construed to limit the invention in any respect.

Example 1

A solution of 4.53 g. of (O-Bzl)Ser-(O-Bzl)Tyr-Gly-Leu-($N^\omega$-$NO_2$)Arg-Pro-Gly-$NH_2$ in 5 ml. of dimethylformamide was treated with 2.577 g. of tert.-butyloxycarbonyl-tryptophane p-nitrophenyl ester. The resulting solution was worked up after 16 hours by evaporating the dimethylformamide in vacuo and placing a solution of the crude protected octapeptide in 15% methanol in chloroform on 150 g. of silica gel. The column was eluted with 5% methanol in chloroform and then the desired compound was eluted with 15% methanol in chloroform. Crystallization from methanol/chloroform afforded 4.0 g. of the pure product, melting at 147–149° C.; $[\alpha]_D^{24°}$ −23.9° (c. 1; dimethylformamide). The NMR spectrum was consistent with the structure and the elemental analysis was correct. The $R_f$ in 15% methanol in chloroform was 0.3.

Example 2

A solution of 1.426 g. of tert.-butyloxycarbonyl-Trp-(O-Bzl)Ser-(O-Bzl)Tyr-Gly-Leu-($N^\omega$-$NO_2$)Arg-Pro-Gly-$NH_2$ in 20 ml. of trifluoroacetic acid/methylene chloride 1:1 in the presence of 200 mg. of mercaptoethanol and 800 mg. of anisole was allowed to stand for 15 minutes at room temperature. The solution was evaporated to a foam in vacuo; methylene chloride was added and this step was repeated 6 times. The resulting solid foam-like material was dissolved in methanol and treated with an ion exchange resin (in the OH cycle). The suspension was filtered and the resin was washed with methanol. The combined filtrate was evaporated to a dry powder which had an undefined melting point. The resulting solid, foam-like material was then dissolved in methanol and the solution was treated with an ion exchange resin (in the OH-cycle) to release the free octapeptide (still carrying the identified R, R' and R'' groups but wherein Y=H) which was obtained by evaporating the methanol solution to dryness, $R_f$ 0.2 in 15% $MeOH/CHCl_3$, showing a single spot. The NMR spectrum and the elemental analysis confirm the expected aminoacid sequence.

To further characterize this material, the above compound was condensed with tert.-butyloxycarbonylhistidine in a procedure similar to that described in Example 1 and the butyloxycarbonyl group was removed as described above. The formed nonapeptide, still carrying protective groups R, R' and R'' was then condensed with pyroglutamic acid pentachlorophenyl ester in dimethyl formamide to the corresponding decapeptide. The condensation product was isolated from the reaction solution by evaporation, dissolution in chloroform and purification by chromatography, using chloroform with increasing amounts of methanol as the eluate. The obtained decapeptide (Formula I wherein R=R'=benzyl, R''=$NO_2$, Y=pyroGlu-His) was then treated with excess hydrogen fluoride acid using anisole as the scavenger. Work-up of the reaction mixture by known methods furnished the compound of Formula I wherein Y is pyroGlu-His and R, R' and R'' are hydrogen. This product was found to be identical with a sample of natural Gn-RH.

By replacing the (O-Bzl)Ser-(O-Bzl)Tyr-Gly-Leu-($N^\omega$-$NO_2$)Arg-Pro-Gly-$NH_2$ used above with other neptapeptides of the same sequence but carrying other protective groups, the following octapeptides are prepared in the same manner:

Y-Trp-(O-tBu)Ser-(O-Bzl)Tyr-Gly-Leu-($N^\omega$-$NO_2$)Arg-pro-Gly-$NH_2$

Y-Trp-(O-Z)Ser-(O-Bzl)Tyr-Gly-Leu-($N^\omega$-$NO_2$)Arg-Pro-Gly-$NH_2$

Y-Trp-(O-THP)Ser-(O-Bzl)Tyr-Gly-Leu-($N^\omega$-$NO_2$)Arg-Pro-Gly-$NH_2$

Y-Trp-(O-MeOBzl)Ser-(O-Bzl)Tyr-Gly-Leu-($N^\omega$-$NO_2$)Arg-Pro-Gly-$NH_2$

Y-Trp-(O-Ac)Ser-(O-Bzl)Tyr-Gly-Leu-($N^\omega$-$NO_2$)Arg-Pro-Gly-$NH_2$

Y-Trp-(O-Bzl)Ser-(O-Z)Tyr-Gly-Leu-($N^\omega$-$NO_2$)Arg-Pro-Gly-$NH_2$

Y-Trp-(O-Bzl)Ser-(O-TRI)Tyr-Gly-Leu-($N^\omega$-$NO_2$)Arg-Pro-Gly-$NH_2$

Y-Trp-(O-Bzl)Ser-(O-Ac)Tyr-Gly-Leu-($N^\omega$-$NO_2$)Arg-Pro-Gly-$NH_2$

Y-Trp-(O-Bzl)Ser-(O-Tos)Tyr-Gly-Leu-(N$^\omega$-NO$_2$)Arg-Pro-Gly-NH$_2$

Y-Trp-(O-Bzl)Ser-(O-THP)Tyr-Gly-Leu-(N$^\omega$-NO$_2$)Arg-Pro-Gly-NH$_2$

Y-Trp-(O-Bzl)Ser-(O-tBu)Tyr-Gly-Leu-(N$^\omega$-NO$_2$)Arg-Pro-Gly-NH$_2$

Y-Trp-(O-Bzl)Ser-(O-MeOBzl)Tyr-Gly-Leu-(N$^\omega$-NO$_2$)Arg Pro-Gly-NH$_2$ wherein Y is a suitable N-blocking group for tryptophane that can be removed without affecting the aminoacid chain, Z stands for benzoxycarbonyl, THP means tetrahydropyranyl, tBu is tert.-butyl, MeOBzl is p-methoxybenzyl, Tos is tosyl (p-toluenesulfonyl), Ac is acetyl and TRI is triphenylmethyl. Other blocking groups that may be used include the trifluoroacetyl and other known alkyl groups that can be cleaved without affecting the desired peptide sequence. In all instances, N$^\omega$ of arginine may carry the tosyl group, benzyloxycarbonyl or similar protective groups in place of the above used nitro group. In each case, the reaction described above proceeds in the same fashion and all of the listed compounds may be converted to Gn-RH by condensing it first with a N$^a$-protected histidine, removing the protective group and condensing the resulting nonapeptide with a suitable pyroglutamic acid ester. By proper selection of the protective groups on Ser, Tyr, Arg (and optionally on His,) all of them may be removed simultaneously with hydrogen fluoride to yield Gn-RH, making these octapeptides all equally useful precursors therefor.

Of course, the synthesis for the protected heptapeptide starting material described above has to be modified when making the heptapeptides carrying different protective groups on the N$^\omega$-arginyl, the seryl or the tyrosyl moieties. Using the other respectively protected aminoacids in the shown sequence does not alter the synthesis described in a significant manner. The individual aminoacids carrying the above-shown protective groups are known in the art and are often used in peptide syntheses; they are described in the English edition of the textbook by Schröder et al., entitled The Peptides I (Academic Press 1965) on pages 167–174 for arginine, pages 210–212 for serine and pages 222–225 for tyrosine or in Peptides, Proceedings of the 9th European Peptide Symposium, edited by Beyerman (North-Holland Publishing Co., Amsterdam 1967) page 50ff for arginine.

I claim:

1. The octapeptide Y-Trp-(O-R)Ser-(O-R')Tyr-Gly-Leu-(N$^\omega$-R'')Arg-Pro-Gly-NH$_2$ wherein Y is hydrogen or tert.-butyloxycarbonyl and R, R' and R'' are hydrogen or protective groups which can be removed by one or more chemical treatments which do not affect the peptide chain.

2. The octapeptide of claim 1 wherein Y is hydrogen.

3. The octapeptide of claim 1 wherein Y is tert.-butyloxycarbonyl.

4. The octapeptide of claim 1 wherein Y is tert.-butyloxycarbonyl or hydrogen, R and R' both are benzyl and R'' is NO$_2$.

5. The process of preparing the nonapeptide Y-Trp-(O-R)Ser-(O-R')Tyr-Gly-Leu-(N$^\omega$-R'')Arg - Pro - Gly-NH$_2$ wherein Y is an easily removable protective group attached to the amino-N of Trp and R, R' and R'' and protective groups which can be removed by one or more chemical treatments which do not affect the aminoacid chain, comprising treating the heptapeptide (O-R)Ser-(O-R')Tyr-Gly-Leu-(N$^\omega$-R'')Arg-Pro-Gly-NH$_2$ with excess Y-Trp wherein R, R', R'' and Y are defined as above in the presence of an inert, polar, organic solvent at a temperature between 0° and 30° C. for a period of at least one hour and isolating the resulting octapeptide form the reaction mixture.

6. The process of claim 5 wherein R and R' are benzyl, R'' is NO$_2$.

7. The process of claim 5 wherein Y-Trp is tert.-butyloxycarbonyltryptophane.

8. The process of claim 5 wherein said inert, polar solvent is dimethylformamide.

References Cited

Baba et al.: Biochem. Biophys. Res. Comm., 44, 459 (July 16, 1971).

Matsuo et al.: Biochem. Biophys. Res. Comm., 43, 1334 (June 18, 1971).

LEWIS GOTTS, Primary Examiner

R. J. SUYAT, Assistant Examiner